(12) United States Patent
Miyamori et al.

(10) Patent No.: US 11,374,523 B2
(45) Date of Patent: Jun. 28, 2022

(54) ELECTRIC MOTOR DRIVE DEVICE AND OUTDOOR UNIT OF AIR CONDITIONER

(71) Applicant: Mitsubishi Electric Corporation, Tokyo (JP)

(72) Inventors: Shun Miyamori, Tokyo (JP); Shinichiro Ura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/268,723

(22) PCT Filed: Sep. 7, 2018

(86) PCT No.: PCT/JP2018/033203
§ 371 (c)(1),
(2) Date: Feb. 16, 2021

(87) PCT Pub. No.: WO2020/049716
PCT Pub. Date: Mar. 12, 2020

(65) Prior Publication Data
US 2021/0234489 A1 Jul. 29, 2021

(51) Int. Cl.
*H02P 25/18* (2006.01)
*F24F 1/20* (2011.01)

(52) U.S. Cl.
CPC .............. *H02P 25/184* (2013.01); *F24F 1/20* (2013.01); *H02P 2201/03* (2013.01)

(58) Field of Classification Search
CPC ...... H02P 1/00; H02P 1/04; H02P 1/10; H02P 1/12; H02P 1/16; H02P 1/163; H02P 1/18; H02P 1/24; H02P 1/26; H02P 1/265; H02P 1/32; H02P 1/42; H02P 1/46; H02P 1/465; H02P 3/00; H02P 3/06; H02P 6/00;
(Continued)

(56) References Cited

U.S. PATENT DOCUMENTS 10,148,213 B2 * 12/2018 Kusakawa ................ A47L 5/12
2011/0169352 A1    7/2011 Nagao et al.
2014/0077633 A1    3/2014 Nagao et al.

FOREIGN PATENT DOCUMENTS

JP    S64-37364 U    3/1989
JP    S64-037364 U   3/1989
(Continued)

OTHER PUBLICATIONS

Office Action dated Aug. 10, 2021 issued in corresponding JP application No. 2020-540969 (and English machine translation).
(Continued)

*Primary Examiner* — Antony M Paul
(74) *Attorney, Agent, or Firm* — Posz Law Group, PLC

(57) ABSTRACT

An electric motor drive device includes: a main substrate mounted with a power supply circuit that generates, on the basis of alternating-current power supplied from an alternating-current power supply, a drive power to drive a compressor motor; a plurality of connection switching relays that perform switching between connections for the compressor motor; a small substrate mounted with the connection switching relays; a relay drive circuit that switches the connection switching relays; lead wires that connect the compressor motor and the small substrate to the power supply circuit; and lead wires that connect the small substrate and the compressor motor.

4 Claims, 4 Drawing Sheets

(58) Field of Classification Search
CPC .... H02P 6/005; H02P 6/12; H02P 6/26; H02P 6/28; H02P 6/32; H02P 7/00; H02P 7/05; H02P 7/292; H02P 8/00; H02P 21/00; H02P 23/00; H02P 23/07; H02P 23/28; H02P 25/00; H02P 25/03; H02P 25/062; H02P 25/064; H02P 25/08; H02P 25/092; H02P 25/18; H02P 27/00; H02P 27/04; H02P 27/06

See application file for complete search history.

(56) References Cited

FOREIGN PATENT DOCUMENTS

| JP | 2008-228513 A | 9/2008 |
| JP | 2009-216324 A | 9/2009 |
| JP | 2011-147253 A | 7/2011 |
| JP | 2012-96761 A | 5/2012 |

OTHER PUBLICATIONS

International Search Report of the International Searching Authority dated Nov. 6, 2018 for the corresponding international application No. PCT/JP2018/033203 (and English translation).

* cited by examiner

ELECTRIC MOTOR DRIVE DEVICE AND OUTDOOR UNIT OF AIR CONDITIONER

CROSS REFERENCE TO RELATED APPLICATION

This application is a U.S. national stage application of International Patent Application No. PCT/JP2018/033203 filed on Sep. 7, 2018, the disclosure of which is incorporated herein by reference.

TECHNICAL FIELD

The present invention relates to an electric motor drive device that provides switching between a Y-connection and a Δ-connection and to an outdoor unit of an air conditioner.

BACKGROUND

An efficient motor operation is required in order to reduce energy consumption.

A Δ-connection motor has a lower back electromotive force than a Y-connection motor. Therefore, under a rated condition in which a rotational speed is higher, the Δ-connection motor is operable at a higher rotational speed than the Y-connection motor. On the other hand, under an intermediate condition in which a rotational speed not high, the Δ-connection motor suffers a greater loss than the Y-connection motor because a large electric current flows in the Δ-connection motor.

Patent Literature 1 discloses a motor equipped with connection switching relays. A drive system is designed to operate a motor in a Δ-connection in the case of a higher load that involves a higher rotational speed of the motor and to operate the motor in a Y-connection in the case of a lower load that involves a rotational speed that is not higher, thereby making it possible to increase efficiency of the motor under an intermediate condition.

Patent Literature

Patent Literature 1: Japanese Patent Application Laid-open No. 2009-216324

In order to control switching between a Y-connection and a Δ-connection, connection switching relays need to be mounted on a substrate. For a three-phase motor, three relays are needed. For a motor that experiences large current flow, large-capacity relays need to be adopted for switching between the connections, and a substrate needs to have a space secured for those relays having greater external dimensions to be mounted thereon. On the other hand, for a model that does not involve any control on switching between the Y-connection and the Δ-connection, a substrate does not need to have a space secured for relays to be mounted thereon. Therefore, in an electric motor drive device using a substrate on which a relay for switching between the connections is mounted thereon, it is difficult for the substrate to be made in common with a substrate for a model requiring no mounting space for a relay.

Summary

The present invention has been made in view of the above circumstances, and an object of the present invention is to provide an electric motor drive device that is capable of using a main substrate common with a substrate used in a model that does not control switching between a Y-connection and a Δ-connection.

In order to solve the above-stated problem and achieve the object, the present invention provides an electric motor drive device comprising: a main substrate on which a power supply circuit is mounted, the power supply circuit generating, on the basis of alternating-current power supplied by an alternating-current power supply, a drive power to drive an electric motor; a small substrate on which two or more connection switching relays are mounted, the connection switching relays performing switching between connections for the electric motor; a relay drive circuit to switch the connection switching relays; first lead wires by which the electric motor and the small substrate are connected to the power supply circuit; and second lead wires by which the small substrate is connected to the electric motor.

The electric motor drive device according to the present invention has an advantageous effect that it can use the same main substrate as used in a model that does not control switching between a Y-connection and a Δ-connection.

DETAILED DESCRIPTION

With reference to the drawings, a detailed description is hereinafter provided of electric motor drive devices and outdoor units of air conditioners according to embodiments of the present invention. It is to be noted that these embodiments are not necessarily intended to limit the present invention.

First Embodiment

Figure 1:
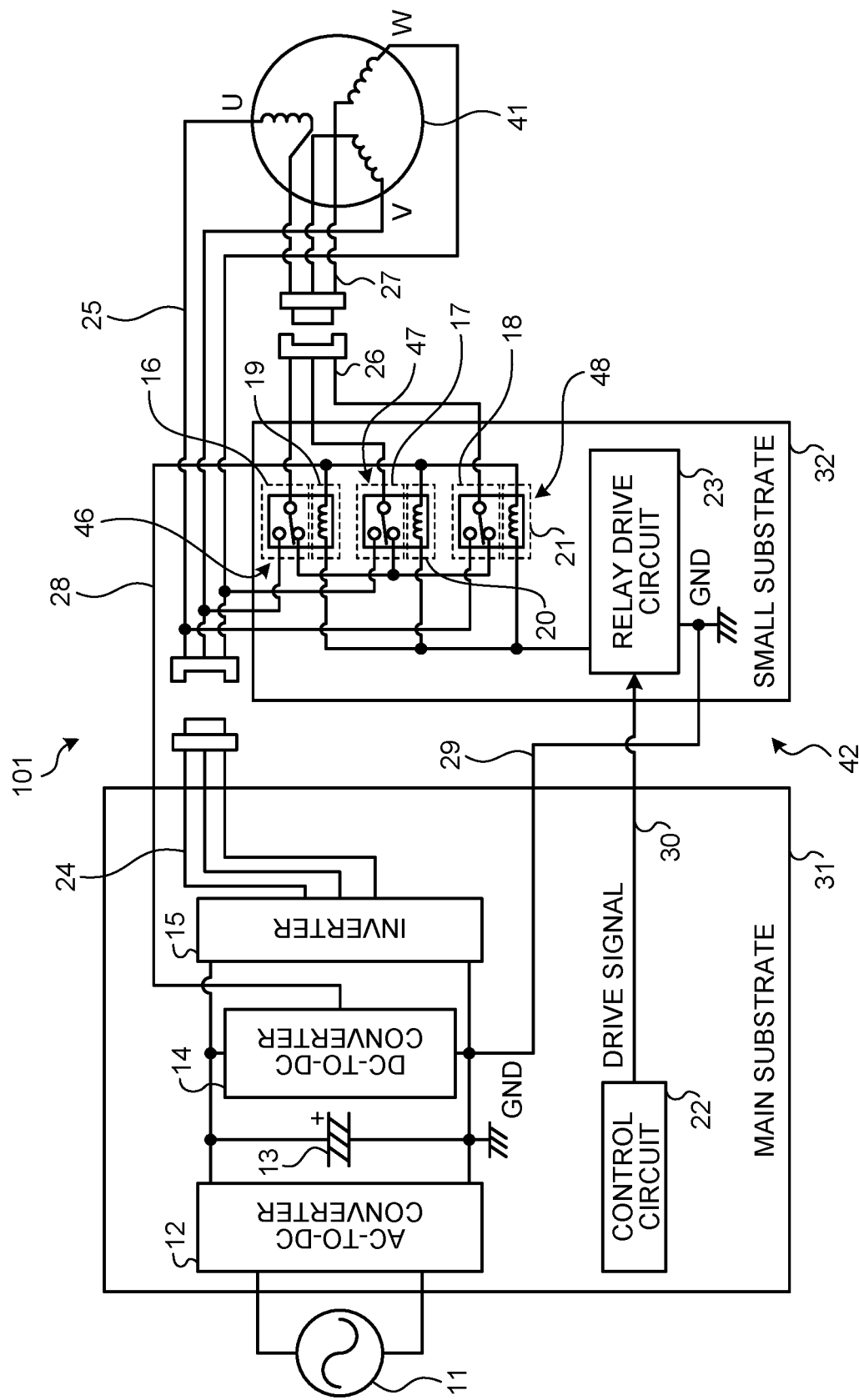
FIG. 1 is a circuit diagram of an outdoor unit to which an electric motor drive device according to a first embodiment of the present invention is applied.

FIG. 1 is a circuit diagram of an outdoor unit of an air conditioner to which an electric motor drive device according to the first embodiment of the present invention is applied. An outdoor unit 101 that is an outdoor equipment for an air conditioner includes a compressor motor 41, which is an electric motor, and an electric motor drive device 42 configured to drive the compressor motor 41. In the electric motor drive device 42, an alternating-current power supply 11 is connected to an input side of an alternating current (AC) to direct current (DC) converter 12, and a smoothing capacitor 13, an input side of a DC-to-DC converter 14, and an inverter 15 are connected to an output side of the AC-to-DC converter 12. Lead wires 24 on an output side of the inverter 15 are connected to lead wires 25. Each of the lead wires 25 has branches with one branch being connected to the compressor motor 41 and with another branch being connected to a relay movable part 16 of a connection switching relay 46, a relay movable part 17 of a connection switching relay 47, or a relay movable part 18 of a connection switching relay 48. Lead wires 26 on an output side of the relay movable parts 16, 17, and 18 are connected to lead wires 27. The compressor motor 41 is connected to the lead wires 27. Relay coils 19, 20, and 21 of the connection switching relays 46, 47, and 48 are connected to an output side of the DC-to-DC converter 14 via a relay coil voltage line 28. A ground line 29 is connected to the relay coils 19, 20, and 21 via a relay drive circuit 23. A control circuit 22 transmits a signal to the relay drive circuit 23 via a relay drive signal line 30 to switch between a Y-connection and a Δ-connection.

The AC-to-DC converter 12, the smoothing capacitor 13, the DC-to-DC converter 14, the inverter 15, and the control circuit 22 are mounted on a main substrate 31. The AC-to-DC converter 12, the smoothing capacitor 13, the DC-to-DC converter 14, and the inverter 15 constitute a power supply circuit that generates, on the basis of alternating-current power supplied from the alternating-current power supply 11, a drive power to drive the compressor motor 41. The lead wires 24 and 25 are categorized as first lead wires that connect the compressor motor 41 and a small substrate 32 to the power supply circuit. The lead wires 26 and 27 are categorized as second lead wires that connect the small substrate 32 to the compressor motor 41. The relay movable parts 16, 17, and 18, the relay coils 19, 20, and 21, and the relay drive circuit 23 are mounted on the small substrate 32.

Figure 2:
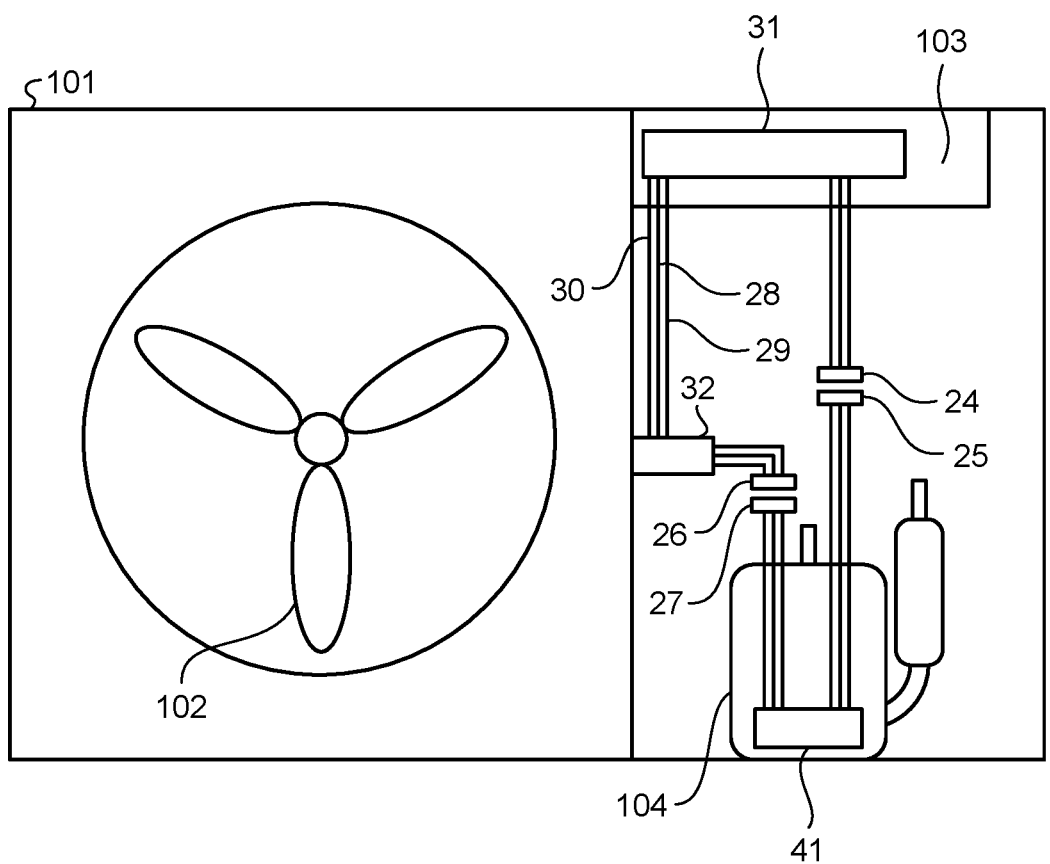
FIG. 2 is a diagram illustrating a configuration of the outdoor unit using the electric motor drive device according to the first embodiment.

FIG. 2 is a diagram illustrating a configuration of the outdoor unit to which the electric motor drive device according to the first embodiment is applied. The outdoor unit 101 is equipped with an outdoor unit fan 102, an electrical component part 103, and a compressor 104. The electrical component part 103 includes the main substrate 31, and the compressor 104 includes the compressor motor 41. The main substrate 31 is connected to the compressor motor 41 via the lead wires 24 and 25. The main substrate 31 and the small substrate 32 are connected by the relay coil voltage line 28, the ground line 29, and the relay drive signal line 30 that transmits a signal to the relay drive circuit 23. The small substrate 32 is connected to the compressor motor 41 via the lead wires 26 and 27. The small substrate 32 is set closer to the compressor 104 than the main substrate 31 is, thereby enabling the lead wires 26 to be shortened. In other words, a distance between the small substrate 32 and the compressor motor 41 is made shorter than a distance between the main substrate 31 and the compressor motor 41, and thereby the lead wires 26 can be made shorter.

The electric motor drive device 42 configured according to the first embodiment has the small substrate 32 provided therein separately from the main substrate 31, and the connection switching relays 46, 47, and 48 mounted on the small substrate 32, and has the three lead wires 26 connected to the connection switching relays 46, 47, and 48, the wires 26 being intended to flow electric currents to the compressor motor 41. Therefore, the main substrate 31 does not need to have a space secured for the connection switching relays 46, 47, and 48 to be mounted thereon. For this reason, the main substrate 31 can be designed to have the same size and shape as a substrate used in a model on which any relays are not mounted. As a result, the main substrate 31 does not need to be developed exclusively for the control of switching between the Y-connection and the Δ-connection, and the main substrate 31 can be used in common in other models. Moreover, by disposing the small substrate 32 close to the compressor 104, the three lead wires 26 connecting the small substrate 32 and the compressor motor 41 can be made short. As a result, the shortened lead wires 26 enable cost reduction and also enable wiring impedances to be decreased, thereby making it possible to reduce an influence of noise.

Second Embodiment

Figure 3:
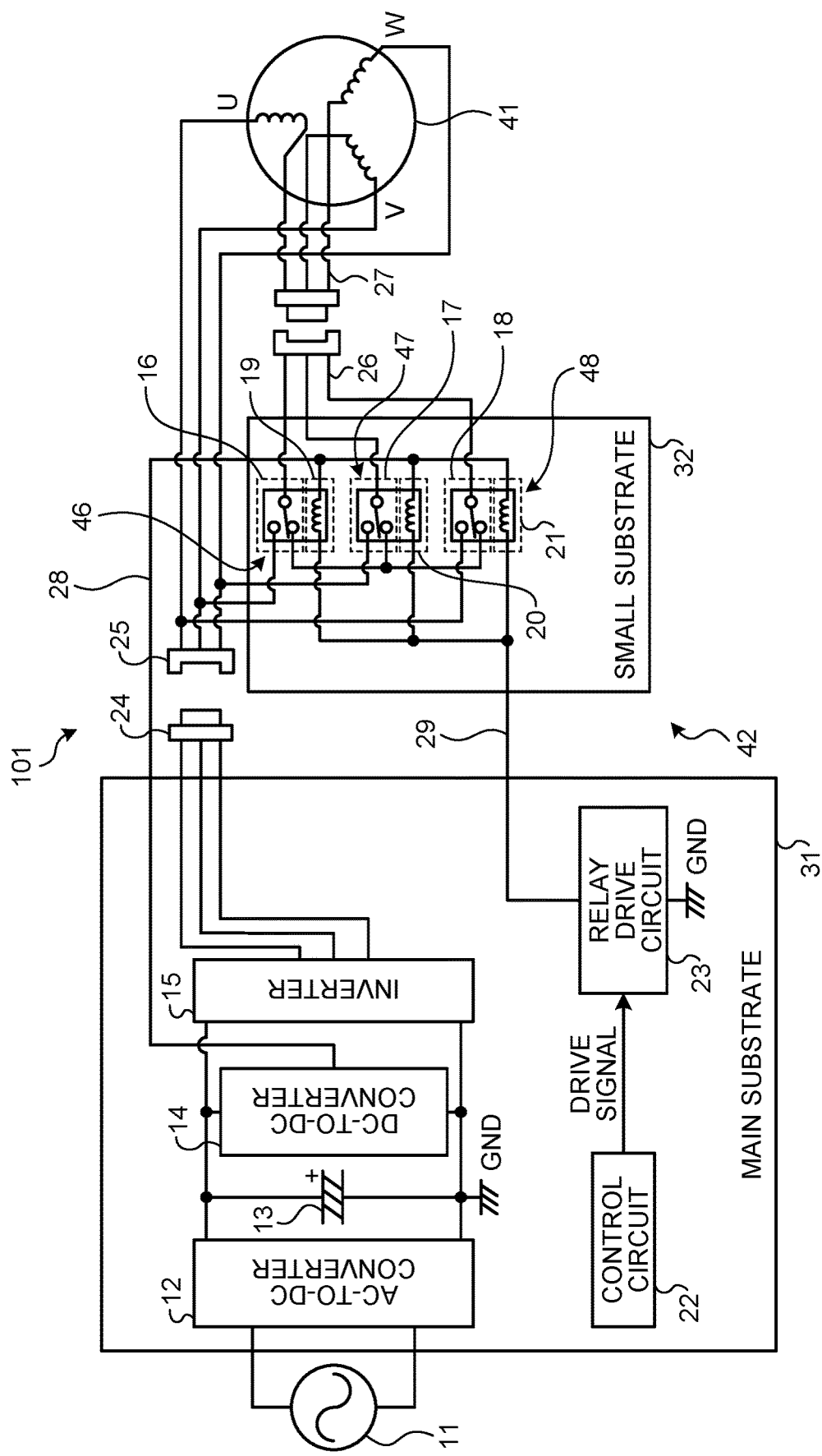
FIG. 3 is a circuit diagram of an outdoor unit to which an electric motor drive device according to a second embodiment of the present invention is applied.

FIG. 3 is a circuit diagram of an outdoor unit to which an electric motor drive device according to the second embodiment of the present invention is applied. The electric motor drive device 42 according to the second embodiment differs from the electric motor drive device 42 according to the first embodiment in that the relay drive circuit 23 is mounted on the main substrate 31 instead of the small substrate 32.

Figure 4:
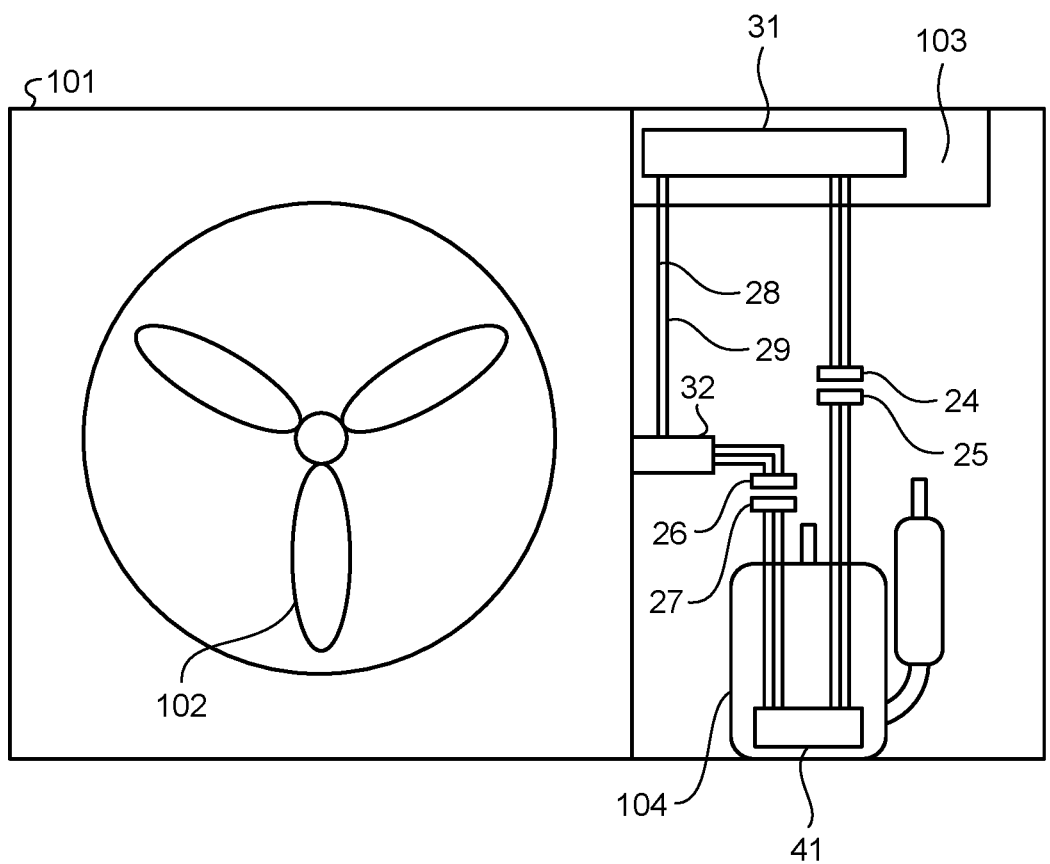
FIG. 4 is a diagram illustrating a configuration of the outdoor unit using the electric motor drive device according to the second embodiment.

FIG. 4 is a diagram illustrating a configuration of the outdoor unit using the electric motor drive device according to the second embodiment. Since the relay drive circuit 23 is mounted on the main substrate 31, a relay drive signal line that connects the control circuit 22 and the relay drive circuit 23 is formed by a conductor pattern on the main substrate 31. Therefore, the number of lead wires connecting the main substrate 31 and the small substrate 32 can be reduced.

The electric motor drive device 42 according to the second embodiment enables the main substrate 31 and the small substrate 32 to be connected by the reduced number of lead wires, thus enabling cost reduction. Moreover, the main substrate 31 does not need to have a space secured for the connection switching relays 46, 47, and 48 to be mounted thereon. Accordingly, the main substrate 31 can be designed to have the same size and shape as a substrate used in a model on which no relays are mounted. Since the main substrate 31 does not need to be developed exclusively for controlled switching between a Y-connection and a Δ-connection, the main substrate 31 can be used in common in other models.

The above configurations illustrated in the embodiments are illustrative of contents of the present invention, and can be each combined with other publicly known techniques and partially omitted and/or modified without departing from the scope of the present invention.

The invention claimed is:

1. An electric motor drive device comprising:
a main substrate on which a power supply circuit and a control circuit are mounted, the power supply circuit generating, on the basis of alternating-current power supplied by an alternating-current power supply, a drive power to drive an electric motor;
a small substrate on which two or more connection switching relays and a relay drive circuit are mounted, the connection switching relays performing switching between connections for the electric motor, the relay drive circuit switching the connection switching relays based on a drive signal from the control circuit;
first lead wires by which the electric motor and the small substrate are connected to the power supply circuit; and
second lead wires by which the small substrate is connected to the electric motor.

2. The electric motor drive device according to claim 1, wherein a distance between the small substrate and the electric motor is shorter than a distance between the main substrate and the electric motor.

3. An outdoor unit of an air conditioner, comprising the electric motor drive device according to claim 1, and an electric motor driven by the electric motor drive device.

4. The outdoor unit of an air conditioner according to claim 3, wherein a distance between the small substrate and the electric motor is shorter than a distance between the main substrate and the electric motor.

\* \* \* \* \*